United States Patent
Lecky

(10) Patent No.: US 9,478,030 B1
(45) Date of Patent: Oct. 25, 2016

(54) AUTOMATIC VISUAL FACT EXTRACTION

(71) Applicant: Amazon Technologies, Inc., Reno, NV (US)

(72) Inventor: Ned Lecky, Vashon, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/219,384

(22) Filed: Mar. 19, 2014

(51) Int. Cl.
*G06K 9/00* (2006.01)
*G06T 7/00* (2006.01)
*G06Q 10/08* (2012.01)

(52) U.S. Cl.
CPC .............. *G06T 7/004* (2013.01); *G06Q 10/08* (2013.01)

(58) Field of Classification Search
CPC . G06K 2209/21; G06T 7/2053; G06T 7/001; G06T 7/0014; G06T 7/0016; G06T 2207/30112; G06T 7/0004; G06T 7/60; G06T 7/602; H04N 1/00708; H04N 1/0071; H04N 1/00713; H04N 1/00716
See application file for complete search history.

(56) References Cited

U.S. PATENT DOCUMENTS

| | | | | |
|---|---|---|---|---|
| 5,809,161 A * | 9/1998 | Auty | .................... | G01P 3/38 340/937 |
| 6,505,094 B2 * | 1/2003 | Pape | .................... | G06Q 10/087 700/216 |
| 6,701,001 B1 * | 3/2004 | Kenneway | ............ | B07C 5/3422 382/141 |
| 7,512,262 B2 * | 3/2009 | Criminisi | ........... | G06K 9/00241 382/106 |
| 7,873,549 B1 * | 1/2011 | Mishra | ................. | G06Q 10/087 705/28 |
| 8,560,406 B1 * | 10/2013 | Antony | .................. | G06Q 10/08 705/28 |
| 8,560,461 B1 * | 10/2013 | Tian | ....................... | G06Q 10/08 705/332 |
| 8,631,922 B2 * | 1/2014 | Stone | ...................... | B65H 7/12 198/340 |
| 8,903,119 B2 * | 12/2014 | Dedeoglu | .......... | G06K 9/00771 382/100 |
| 2004/0165748 A1 * | 8/2004 | Bonner | .............. | G06K 9/00973 382/101 |
| 2005/0031224 A1 * | 2/2005 | Prilutsky | .............. | G06K 9/0061 382/275 |
| 2010/0290665 A1 * | 11/2010 | Sones | .................. | G01B 11/024 382/100 |
| 2011/0295469 A1 * | 12/2011 | Rafii | ..................... | G06T 7/2053 701/49 |
| 2012/0087572 A1 * | 4/2012 | Dedeoglu | .......... | G06K 9/00771 382/154 |
| 2013/0259315 A1 * | 10/2013 | Angot | .................. | H04N 13/026 382/106 |

* cited by examiner

*Primary Examiner* — Avinash Yentrapati
(74) *Attorney, Agent, or Firm* — Athorus, PLLC

(57) ABSTRACT

By evaluating readily available facts regarding an object, an item may be identified, or one or more characteristics of the item may be determined, and a destination for the item may be selected. An extraction module including a depth sensor may capture depth imaging data regarding the item, which may then be processed in order to estimate one or more dimensions of the item, and an appropriate container or storage area for the item may be selected. Additionally, the extraction module may further include a scale for determining a mass of the item, or digital cameras for capturing one or more images of the item. The images of the item may be analyzed in order to interpret any markings, labels or identifiers disposed on the item, and a destination for the item may be selected based on the mass,ent, the analyzed images or the depth imaging data.

21 Claims, 9 Drawing Sheets

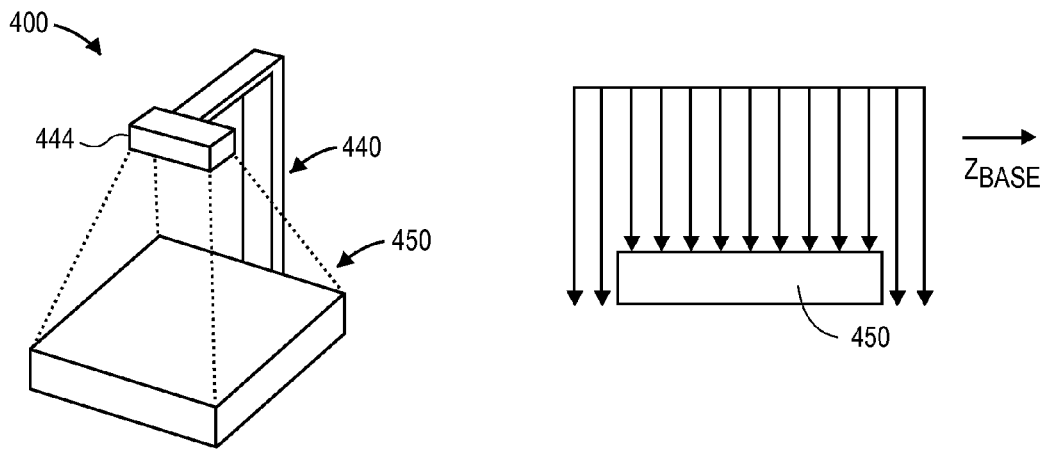
FIG. 4A
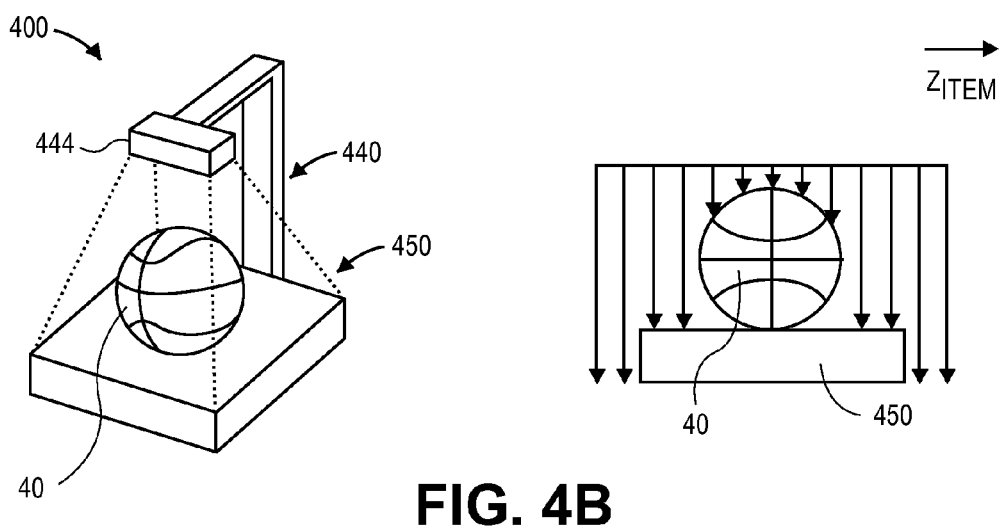
FIG. 4B
$$\overrightarrow{z_{ITEM}} - \overrightarrow{z_{BASE}} =$$
FIG. 4C

FIG. 5A — 500A, X₅₄₂, Y₅₄₂

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 0 | 0 | 0 | 0 | 0 | 0 | 0 | 0 | 0 | 0 | 0 | 0 | 0 | 0 |

FIG. 5B — 500B, X₅₄₂, Y₅₄₂

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 124 | 124 | 4 | 4 | 4 | 4 | 4 | 0 |
| 0 | 4 | 4 | 4 | 4 | 124 | 184 | 184 | 184 | 184 | 124 | 4 | 4 | 4 | 0 |
| 0 | 4 | 4 | 4 | 4 | 184 | 184 | 229 | 229 | 184 | 184 | 4 | 4 | 4 | 0 |
| 0 | 4 | 4 | 4 | 124 | 184 | 229 | 244 | 244 | 229 | 184 | 124 | 4 | 4 | 0 |
| 0 | 4 | 4 | 4 | 124 | 184 | 229 | 244 | 244 | 229 | 184 | 124 | 4 | 4 | 0 |
| 0 | 4 | 4 | 4 | 4 | 184 | 184 | 229 | 229 | 184 | 184 | 4 | 4 | 4 | 0 |
| 0 | 4 | 4 | 4 | 4 | 124 | 184 | 184 | 184 | 184 | 124 | 4 | 4 | 4 | 0 |
| 0 | 4 | 4 | 4 | 4 | 4 | 4 | 124 | 124 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 4 | 4 | 4 | 4 | 4 | 4 | 4 | 4 | 4 | 4 | 4 | 4 | 4 | 0 |
| 0 | 0 | 0 | 0 | 0 | 0 | 0 | 0 | 0 | 0 | 0 | 0 | 0 | 0 | 0 |

FIG. 5C — 500C, X₅₄₂, Y₅₄₂

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 120 | 120 | 0 | 0 | 0 | 0 | 0 | 0 |
| 0 | 0 | 0 | 0 | 0 | 120 | 180 | 180 | 180 | 180 | 120 | 0 | 0 | 0 | 0 |
| 0 | 0 | 0 | 0 | 0 | 180 | 180 | 225 | 225 | 180 | 180 | 0 | 0 | 0 | 0 |
| 0 | 0 | 0 | 0 | 120 | 180 | 225 | 240 | 240 | 225 | 180 | 120 | 0 | 0 | 0 |
| 0 | 0 | 0 | 0 | 120 | 180 | 225 | 240 | 240 | 225 | 180 | 120 | 0 | 0 | 0 |
| 0 | 0 | 0 | 0 | 0 | 180 | 180 | 225 | 225 | 180 | 180 | 0 | 0 | 0 | 0 |
| 0 | 0 | 0 | 0 | 0 | 120 | 180 | 180 | 180 | 180 | 120 | 0 | 0 | 0 | 0 |
| 0 | 0 | 0 | 0 | 0 | 0 | 0 | 120 | 120 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 7
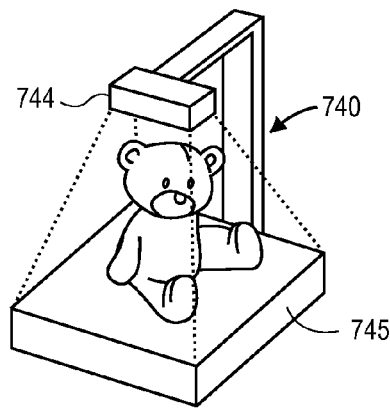
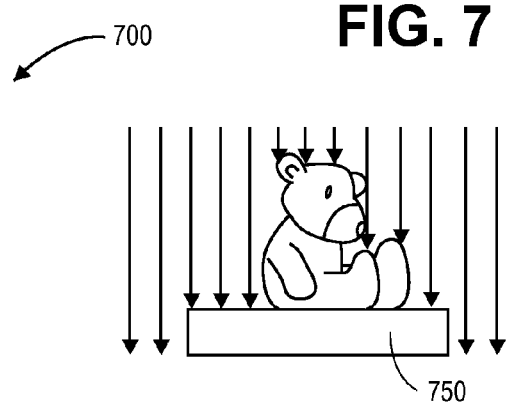
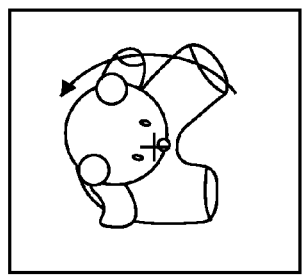
TOP VIEW
ROTATE DEPTH IMAGE TO DETERMINE MINIMUM WIDTH X AND CORRESPONDING LENGTH Y
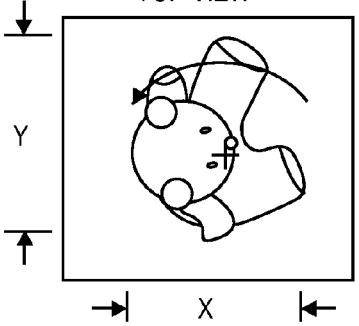
TOP VIEW
MINIMUM WIDTH X AND CORRESPONDING LENGTH Y
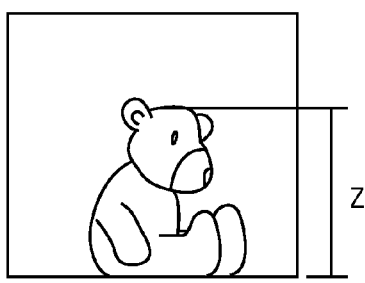
SIDE VIEW
OBTAIN MAXIMUM HEIGHT Z DEPTH, IMAGE
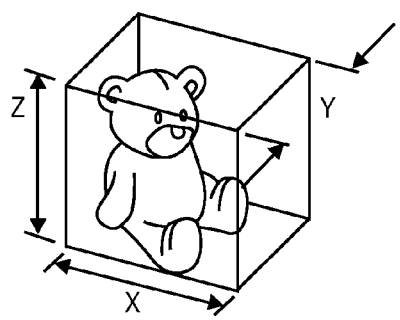
ESTIMATE VOLUME BASED ON X,Y,Z

AUTOMATIC VISUAL FACT EXTRACTION

BACKGROUND

Online marketplaces frequently maintain inventories of items in one or more storage or distribution facilities, which are sometimes called fulfillment centers. Such facilities may include stations for receiving shipments of items, stations for storing such items, and/or stations for preparing such items for delivery to customers. For example, when a vendor delivers an inbound shipment of items to a fulfillment center, the shipment may arrive at a receiving station, where the items included in the shipment may be removed from the containers in which they arrived and transported to one or more storage areas within the fulfillment center. Likewise, when an online marketplace receives an order for one or more items from a customer, the items may be retrieved from their respective storage areas within the fulfillment center and transported to a distribution station, where the items may be prepared for delivery to the customer in an appropriate container with a suitable amount or type of dunnage.

Because modern online marketplaces have the capacity to offer large numbers of unique items for sale to customers, hundreds or even thousands of items may be in motion at any given time within a fulfillment center associated with an online marketplace. Such items may be transported by one or more conveying systems, which are mechanical systems including one or more movers for moving large objects or materials from one location to another that may be employed in a variety of throughput applications. For example, items may be transported throughout a fulfillment center on a conveyor belt, e.g., a system of two or more pulleys or pulley-like wheels causing motion of a continuous loop band that may also include machines or features for changing a direction of travel of objects being conveyed, or for moving objects from one conveyor to another, which are sometimes called diverters or divert mechanisms. Items are typically transported between a receiving station and a storage area, or between the storage area and a distribution station, or to or from any origin or destination within the fulfillment center.

In order to improve the efficiency of fulfillment center operations, it is advantageous to identify an item, or to determine information regarding the item (e.g., characteristics, contents or dimensions of the item) as early as possible. Once an identity of an item, or information regarding the item, has been determined, an appropriate destination for the item may be selected as soon as is practical. For example, the dimensions of an item that has arrived in an inbound shipment must be determined in order to choose an appropriate storage area or region for the item, while the dimensions of an ordered item must be identified in order to select an appropriately sized container for the item. Presently, some systems and methods for determining dimensions of items operate using multiple acoustic sensors that may be oriented with regard to one or more coordinate axes. Such systems may bounce a plurality of sound waves off of surfaces of an item either in series or in parallel, and information regarding the dimensions of the items may be determined from the acoustic properties of the waves reflected from the item's surfaces.

While some acoustic systems may be accurate and effective for determining dimensions of uniformly shaped items or items having substantially constantly shaped faces (e.g., items shaped in the form of cubes or other rectangular solids), such systems may be inaccurate or ineffective where the items to be evaluated are eccentrically shaped (i.e., not uniformly or substantially constantly shaped). Based on empirical data, in some situations, dimensions of eccentrically shaped items that are determined by acoustic means may be off by one-half of an inch or more. Because the offerings of items at online marketplaces continue to grow and diversify over time, the number of eccentrically shaped items that are distributed to customers through fulfillment centers have steadily increased, compounding the effects of the inability to accurately determine dimensions of such items, thereby leading to inefficient uses of space within fulfillment centers and increased shipping costs.

BRIEF DESCRIPTION OF THE DRAWINGS

FIGS. 4A, 4B and 4C are views of one system for automatic visual fact extraction, in accordance with embodiments of the present disclosure.

FIGS. 5A, 5B and 5C are views of data considered by one system for automatic visual fact extraction, in accordance with embodiments of the present disclosure.

FIG. 7 is a view of one system for automatic visual fact extraction, in accordance with embodiments of the present disclosure.

DETAILED DESCRIPTION

Figure 1:
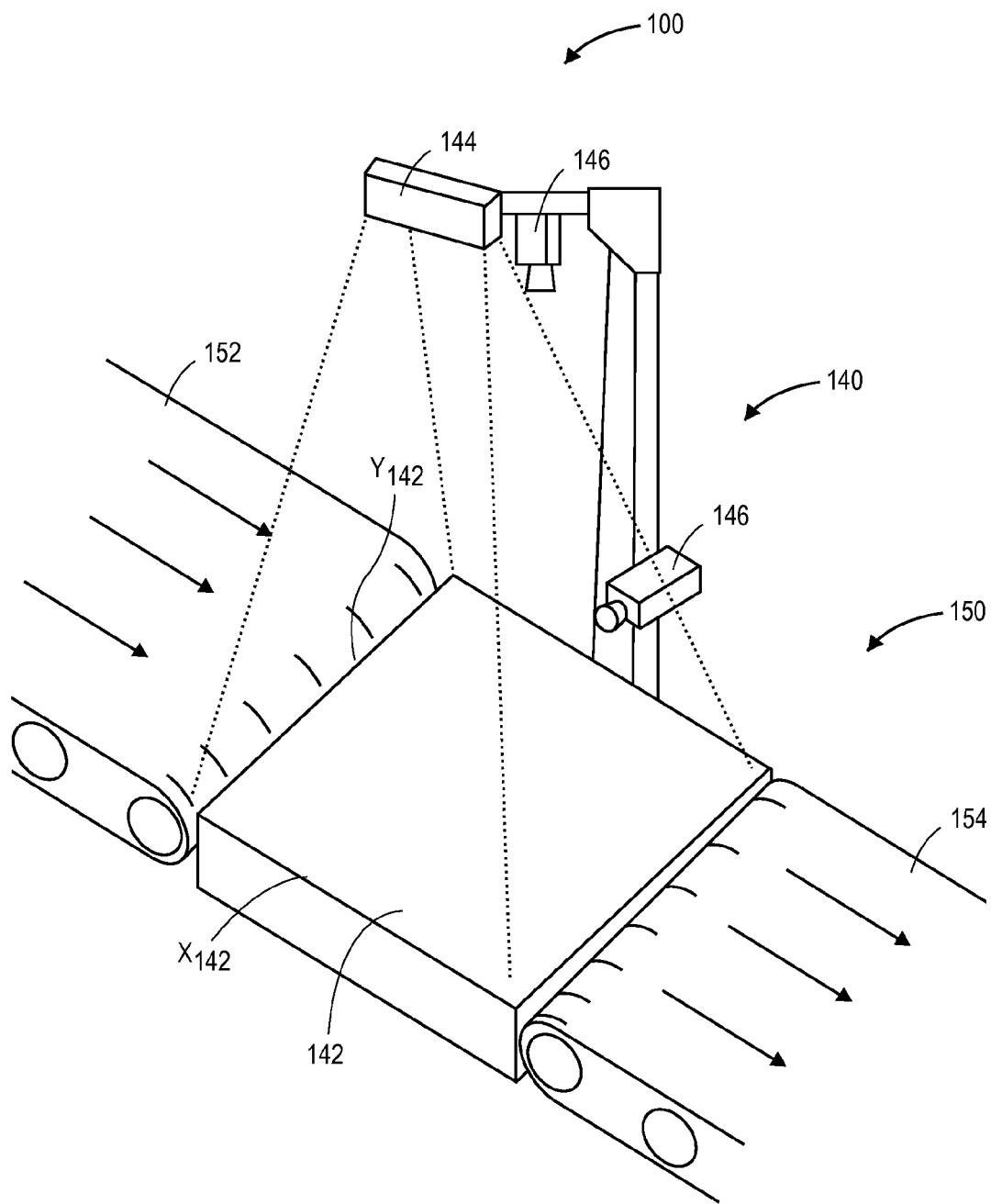
FIG. 1 is a view of one system for automatic visual fact extraction, in accordance with embodiments of the present disclosure.

As is set forth in greater detail below, the present disclosure is directed to the automatic visual extraction of facts regarding objects from imaging data and other information captured from such objects. Specifically, the systems and methods are directed to capturing imaging data or other information regarding an object, which may be stationary or in motion, and identifying or otherwise determining characteristics of the object from the data or information. The imaging data or information may be captured using any form of sensor, such as imaging devices, depth sensors, scales or other like information-gathering computer-based machines. For example, based at least in part on the imaging data or information, a bounding volume of the object may be estimated using known information regarding dimensions of an object in a first dimension that was determined using a single sensor, and by projecting the information to estimate second and third dimensions of the object. Alternatively, a surface area of one or more sides of the object, or a longest length of the object, may be estimated using such known information.

Additionally, a plurality of data or information captured regarding an object from multiple sensors, including masses or dimensions of the object derived from such data or information, or digital images of the object captured from multiple perspectives, may be processed in order to identify the object. Once such dimensions, masses or other characteristics are determined, the dimensions, masses or other characteristics may be considered when automatically determining a destination for the object, as well as an area, a region or a container in which the object is to be placed or stored.

A typical fulfillment center, such as those that are associated with modern online marketplaces, may be configured to receive, store and/or distribute hundreds of thousands, or even millions, of items at any given time. For example, when an item arrives at a receiving station associated with a fulfillment center, a worker may remove the item from a container and transport the item to an assigned storage facility within the fulfillment center (e.g., a shelf, bin, rack, tier, bar, hook or other storage means) by a conveying system, which may include any number of machines or elements for causing the motion or translation of such objects, items or materials from one location to another and are driven by any form of mover, e.g., belts, chains, screws, tracks or rollers, which may further include pulleys, shafts, hubs, bushings, sprockets, bearings and other elements for causing a movement of the item either within a container or carrier, or on or within the mover itself. Likewise, when an order for the item is received from a customer, another worker may retrieve the item from the assigned storage facility, and transport the item to a distribution station by way of the conveying system, and the item may be prepared for delivery to the customer. Alternatively, where an order for an item has already been received from a customer when the item arrives at the fulfillment center, the ordered item may be transported directly from the receiving station to the distribution station, or "cross-docked," for prompt delivery to the customer using the conveying system.

One component commonly found in conveyor systems is a conveyor belt, which may include a banded continuous-loop belt (e.g., rubber or fabric) that is placed into motion by a series of two or more pulleys, at least one of which is driven by a motor. Objects, items or materials may be placed directly onto the belt, or into one or more bins or like containers that may be placed on the belt. Similarly, a chain conveyor may carry one or more pendants, which may be used to pull unit loads on pallets or in other large-scale containers. Conveyor systems may also include a gravity conveyor, which may consist of a series of rollers that may be used to move objects based on a difference in height, and a resulting difference in gravitational potential energy, without the use of a motor.

When an item is to be transported from one location to another within a fulfillment center, determining an identity of the item, or characteristics of the item, are essential in selecting an appropriate destination for the item. Naturally, dimensions of an item are typically immutable restrictions as to the specific locations or regions within the fulfillment center where the item may be stored upon its arrival, or containers into which the item may be packed and delivered to a customer. Additionally, characteristics of the item, such as whether the item contains fragile or flammable components, or hazardous materials, may act as further restrictions on a location where the item may be stored, or a manner in which the item may be delivered to a customer.

Therefore, those of ordinary skill in the pertinent arts recognize that identifying an item, or determining characteristics of the item, as early as possible while an item is in transit is advantageous because knowing the identity of the item, or the characteristics regarding the item, are essential in order to identify an appropriate location or region where the item may be stored, or a suitable container for transporting the item to an intended destination.

The systems and methods of the present disclosure are directed to automatically extracting visual facts regarding an object from imaging data and information regarding the object captured using extractor modules having one or more sensors. According to some embodiments of the systems and methods disclosed herein, an object may be identified, and characteristics of the object may be determined, based on visual facts that may be extracted from the imaging data and information, including imaging data and information relating not only to colors, textures or outlines of objects but also to distances to objects, positions of objects and/or orientations of objects. For example, visual facts in the form of imaging data or information captured from a single depth sensor or range camera may be used to estimate a first dimension of an object (e.g., a height of the object), and processed to estimate second and third dimensions of the object from such visual facts, or to estimate a surface area or a bounding volume of the object using such dimensions. Moreover, according to some other embodiments of the present disclosure, such visual facts may be augmented by other information or data regarding the object, such as a mass of the object as determined by one or more scales. Furthermore, any markings, labels or other identifiers that may be disposed on an object, such as one-dimensional bar codes, two-dimensional bar codes (e.g., "QR codes"), bokodes, characters, numbers, symbols, or colors may also be interpreted and used to identify the object, or characteristics of the object.

The systems and methods of the present disclosure may incorporate any form of imaging device for capturing images or ranging data regarding an object. For example, images of objects may be captured by any form of imaging device, camera or like device, such as a digital area-scan or line-scan camera configured to capture light reflected from objects, in order to calculate or assign one or more quantitative values of the reflected light, and to generate one or more outputs based on such values, or to store such values in one or more data stores. Such devices may detect reflected light within their respective fields of view, which may be defined by a function of a distance between a sensor and a lens within the camera (viz., a focal length), as well as a location of the camera and an angular orientation of the camera's lens. Additionally, where an object appears within a depth of field, or a distance within the field of view where the clarity and focus is sufficiently sharp, a digital camera may capture light that is reflected off objects of any kind to a sufficiently high degree of resolution using one or more sensors thereof, and store information regarding the reflected light in one or more data files.

Those of ordinary skill in the pertinent arts further recognize that information and/or data regarding features or objects expressed in a digital image, including colors, textures or outlines of the objects, may be extracted from the photograph in any number of ways, such as by using any form of photogrammetric analyses. For example, colors of pixels, or of groups of pixels, in a digital photograph may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital photograph may be identified using one or more computer-based methods, such as by identifying changes in intensities within regions or sectors of the photograph, or by defining areas of a photograph corresponding to specific surfaces. Furthermore, outlines of objects expressed in a digital photograph may be identified using one or more algorithms or machine-learning tools. Some such algorithms or tools may recognize edges, contours or outlines of objects in a digital photograph, or of portions of objects in the digital photograph, and may match the edges, contours or outlines of the objects against information regarding edges, contours or outlines of known objects, which may be stored in one or more data stores.

Additionally, depth data or ranging data, e.g., a distance or depth to an object, may be captured from a depth sensor, a range camera or another like imaging device. For example, such devices may include infrared projectors for projecting infrared light onto one or more surfaces of an object and infrared sensors including arrays of pixel detectors for capturing digital imaging data regarding the wavelengths of the reflected light within different spectral bands, such as relatively lower frequency bands associated with infrared light, which may be projected upon an object in order to determine information regarding a distance to the object from which such light is reflected, or an orientation or configuration of the object. For example, the reflected light within the infrared bands may be processed in order to recognize a distance to the object, as well as one or more dimensions (e.g., heights, widths or lengths) of the object.

Moreover, those of ordinary skill in the pertinent arts would further recognize that an imaging device for capturing images of objects, e.g., a digital camera, and an imaging device for capturing ranging or depth information regarding objects, e.g., a depth sensor or range camera, may be combined into a single imaging device or sensor. For example, one such device is an RGB-Z sensor, which may capture not only color-based imaging information regarding an object (e.g., colors of pixels in an image of the object, expressed according to the RGB color model) but also information regarding distances from the object (e.g., a depth or a range z to the object).

According to some embodiments of the present disclosure, an extractor module including a scale for determining a mass of an object, and one or more imaging devices configured to capture data or information regarding colors, textures or outlines of objects, as well as distances or ranges to objects, or depths of objects, may be provided in series with one or more elements of a conveyor system. The imaging device may be oriented to determine a range to an object or a depth of an object with regard to any axis. Preferably, the imaging device is oriented along a vertical or z-axis to determine ranges to objects or depths of objects from above the scale. The extractor module may be configured to estimate one or more dimensions of an object by capturing a baseline depth image of a defined imaging region using a single depth sensor or range camera, as well as a depth image of the defined imaging region with the object therein. An array of pixel depth data may be defined by differences between the pixels of the depth image of the defined imaging region with the object therein, and the pixels of the baseline depth image of the defined imaging region.

The dimensions of the object along the z-axis (e.g., heights of various aspects of the object) may be estimated based at least in part on one or more values of the pixel depth data array, which defines a depth profile of the object. Moreover, the dimensions of the object along the x-axis and y-axis, respectively, may be estimated by determining the sizes of each of the pixels based at least in part on a maximum estimated height of the object, or by digitally rotating the pixel depth data to determine minimum widths and corresponding lengths of the object. Using the estimated dimensions along the x-, y- and z-axes, an estimated volume of the object may be determined, and a container may be selected for the object based on the estimated volume.

According to some other embodiments of the present disclosure, an extractor module including a scale and a plurality of imaging devices may be configured to determine a mass of an object, as well as depths or ranges to aspects of the object, and to capture one or more high-resolutions of the object and to interpret any markings, labels or other identifiers disposed on the object. The extractor module may be provided in series with one or more elements of a conveyor system. Based at least in part on such information, an identity of the object, or characteristics of the object, may be estimated to an acceptable level of tolerance, and a destination for the object may be determined based on the estimated object or characteristics of the object. The object may be routed to the selected destination by the conveyor system.

Referring to FIG. 1, a system 100 for automatic visual fact extraction in accordance with embodiments of the present disclosure is shown. The system 100 includes an extractor module 140 and portions of a conveyor system 150. The extractor module 140 of FIG. 1 includes a scale 142, as well as a range camera (or depth sensor or depth camera) 144 mounted to a frame and oriented above the scale 142, and imaging devices (e.g., digital cameras, charge-coupled device imagers, thermal imagers or other like devices or modules) 146 mounted to the frame and oriented to capture images of an imaging region defined by the scale 142 and having dimensions $X_{1425}$ $y_{142}$. As is shown in FIG. 1, the range camera 144 is oriented to determine ranges within the imaging region defined by the scale 142. The conveyor system 150 includes an ingress conveyor 152 and an egress conveyor 154.

As is discussed above, the system 100 of FIG. 1 may be configured to extract a variety of facts from information and data regarding objects, such as objects passing through the extraction module 140 by way of the conveyor system 150. For example, the scale 142, which may be a digital or analog scale of any type or form known to those of ordinary skill in the pertinent arts, may determine a mass of an object. Additionally, a depth or range between the range camera 144 and various aspects of the object may be determined, and a depth profile of the object may be defined by subtracting pixel data of a baseline depth image of the imaging region (i.e., without an object present therein) from pixel data of a depth image of the imaging region (i.e., with an object present therein), or by determining net pixel data associated with the object. Those of ordinary skill in the pertinent arts will understand that the term "net pixel data," or like terms used herein, associated with an object of interest may refer to imaging data defining depths or heights of the object of interest that is obtained by subtracting pixel data of a baseline depth image from pixel data of a depth image that includes the object of interest present therein. Such depths or ranges may be defined or measured with regard to any standard, such as a distance from the range camera 144 to the object, or a net distance calculated from any baseline or benchmark. Moreover, images of the object may be captured using the digital cameras 146, and such images may be subsequently processed in order to recognize any colors, textures or outlines of the objects, as well as to interpret any markings, labels or other identifiers disposed on the object.

Accordingly, using readily available information regarding an object, including data or information extracted by a scale, a depth sensor or range camera, and one or more imaging cameras, an extraction module, such as the extraction module 140 of the system 100 of FIG. 1, may determine one or more dimensions or other characteristics of an object. Based at least in part on such dimensions or characteristics, a specific location or region within the fulfillment center where a container may be placed stored, or a particular container into which the item may be packed and delivered to a customer, may be selected.

Figure 2:
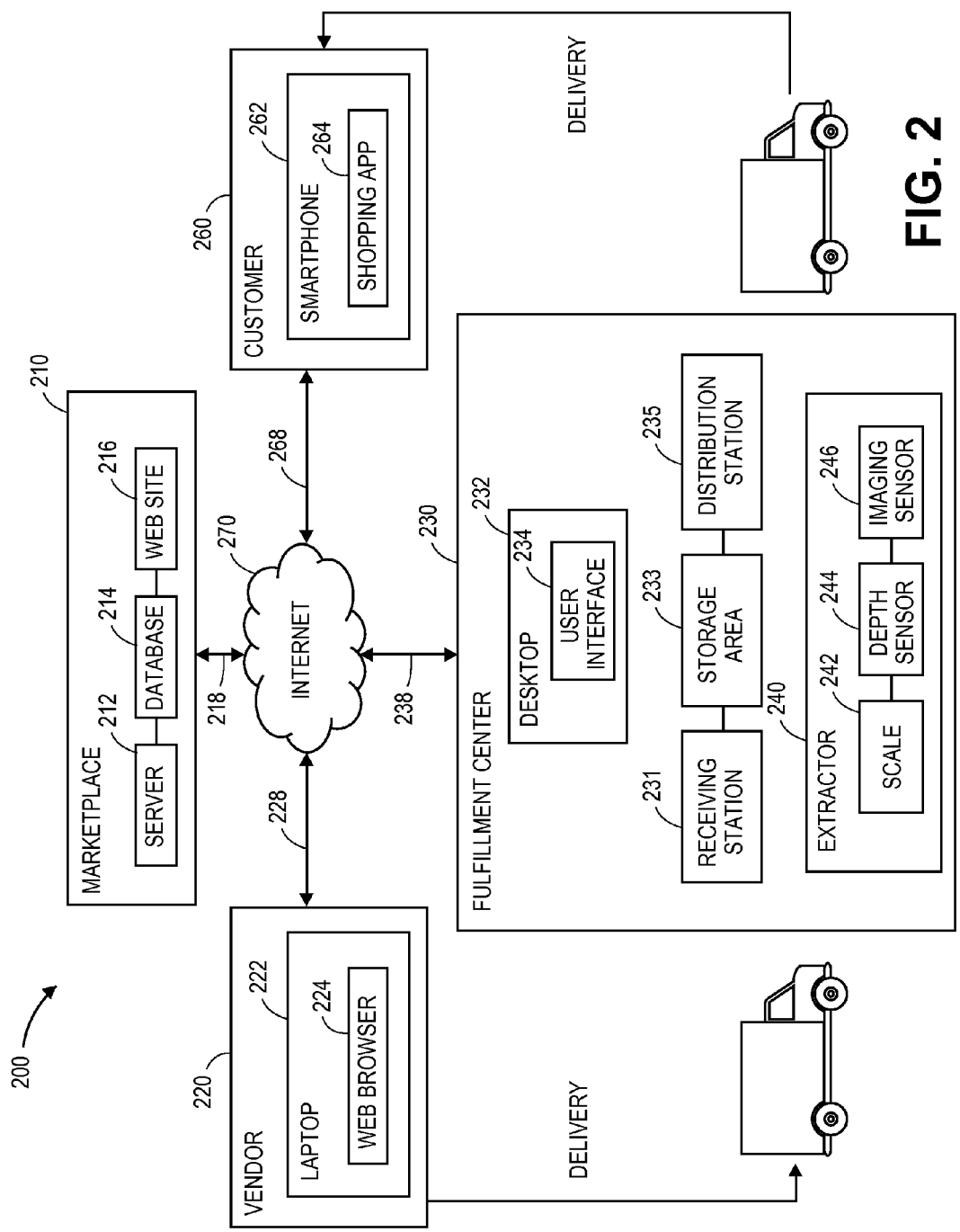
FIG. 2 is a block diagram of components of one system for automatic visual fact extraction, in accordance with embodiments of the present disclosure.

Referring to FIG. 2, a block diagram of one system 200 for automatic visual fact extraction is shown. The system 200 includes a marketplace 210, a vendor 220, a fulfillment center 230 and a customer 260 that are connected to one another across a network 270, such as the Internet.

The marketplace 210 may be any entity or individual that wishes to make items from a variety of sources available for download, purchase, rent, lease or borrowing by customers using a networked computer infrastructure, including one or more physical computer servers 212 and databases 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 270, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 260, by way of the marketplace 210. The vendor 220 may operate one or more order processing and/or communication systems using a computing device such as a laptop computer 222 and/or software applications such as a web browser 224, which may be implemented through one or more computing machines that may be connected to the network 270, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a desktop computer 232, as well as stations for receiving, storing and distributing items to customers, including but not limited to a receiving station 231, a storage area 233 and a distribution station 235. As is also shown in FIG. 2, the fulfillment center 230 further includes an extractor module 240 having a scale 242, a depth sensor (or depth camera, or range camera) 244 and an imaging sensor 246.

The fulfillment center 230 may operate one or more order processing and/or communication systems using a computing device such as the desktop computer 232 and/or software applications having one or more user interfaces 234 (e.g., a browser), or through one or more other computing devices or machines that may be connected to the network 270, as is indicated by line 238, in order to transmit or receive information in the form of digital or analog data, or for any other purpose. The computer 232 may also operate or provide access to one or more reporting systems for receiving or displaying information or data regarding workflow operations, and may provide one or more interfaces, such as the user interface 234, for receiving interactions (e.g., text, numeric entries or selections) from one or more operators, users or workers in response to such information or data. The computer 232 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235, as well as the extractor module 240. Such control systems may be associated with the computer 232 or with one or more other computing devices or machines, and may communicate with the extractor module 240 within the fulfillment center 230 by any known wired or wireless means, or with the marketplace 210, the vendor 220 or the customer 260 over the network 270, as indicated by line 238, through the sending and receiving of digital data.

Additionally, the fulfillment center 230 may include one or more systems or devices (not shown in FIG. 2) for determining a location of one or more elements therein, such as cameras or other image recording devices. Furthermore, the fulfillment center 230 may also include one or more workers or staff members, who may handle or transport items within the fulfillment center 230. Such workers may operate one or more computing devices or machines for registering the receipt, retrieval, transportation or storage of items within the fulfillment center, such as the computer 232, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

As is shown in FIG. 2, the extractor module 240 includes the scale 242, the depth sensor 244 and the imaging sensor 246. The scale 242 may be any form of electronic scale having sufficient electronic and other components that may be configured to determine a mass or weight of an object, and to generate or transmit a digital or analog signal corresponding to the mass or weight. Those of ordinary skill in the pertinent arts will recognize that the scale 242 may further include any sufficient circuitry or electronic components for calibrating the scale 242, for displaying information regarding a mass or weight of the object, and that the scale 242 may operate under the control of, or provide information to, the desktop computer 232 or to one or more external computer devices by way of the network 270. Additionally, the scale 242 may operate in any conventional manner to determine the mass or weight.

As is also shown in FIG. 2, the extractor module 240 further includes the depth sensor 244 and the imaging sensor 246. As is discussed above, the depth sensor 244 may be any form of device, such as a range camera, configured to determine a range to one or more objects, or one or more elements of objects, or to otherwise sense positions or motions of objects. The depth sensors 244 of the present disclosure may be configured to determine depths or ranges along any axis or in any direction. For example, as is shown in the system 100 of FIG. 1, the range camera 144 is shown as having a field of view oriented vertically downward, such that the range camera 144 may be configured to determine depths or ranges between the range camera 144 and an imaging region defined by the scale 142. Additionally, the depth sensor 244 may be programmed or controlled to determine depths or ranges to objects present within an imaging region at specific times or upon the occurrence of specific events, i.e., the presence of an object on the scale 142 by way of the conveyor system 150 of FIG. 1.

The imaging sensor 246 may be any form of optical recording device mounted to or otherwise associated with the extractor module 240, e.g., a digital camera that may be mounted to a frame of the extractor module 240, such as is shown in FIG. 1. For example, the imaging device 246 may be used to photograph or otherwise capture and record images of items traveling along one or more conveyor systems within the fulfillment center 230, such as the conveyor system 150 of FIG. 1, or across the scale 242, and for any purpose. The imaging sensor 246 may be configured to operate in conjunction with, or independently from, the scale 242 or the depth sensor 244. Moreover, those of ordinary skill in the pertinent arts would recognize that the depth sensor 244 and the imaging sensor 246 may be combined into a single unit or component, such as an RGB-Z sensor.

The customer 260 may be any entity or individual that wishes to download, purchase, rent, lease, borrow or otherwise obtain items (which may include goods, products, services or information of any type or form) from the marketplace 210. The customer 260 may utilize one or more computing devices, such as a smartphone 262 or any other like machine that may operate or access one or more software applications, such as a web browser (not shown) or a shopping application 264, and may be connected to or otherwise communicate with the marketplace 210, the vendor 220 or the fulfillment center 230 through the network 270, as indicated by line 268, by the transmission and receipt of digital data. Moreover, the customer 260 may also receive deliveries or shipments of one or items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker" or a "customer" may be typically performed by a human operator, but could, alternatively, be performed by an automated agent.

The marketplace 210, the vendor 220, the fulfillment center 230 and/or the customer 260 may use any web-enabled or Internet applications or features, or any other client-server applications or features including electronic mail (or E-mail), or other messaging techniques, to connect to the network 270 or to communicate with one another, such as through short or multimedia messaging service (SMS or MMS) text messages. For example, the fulfillment center 230 and/or the desktop computer 232 may be adapted to transmit information or data in the form of synchronous or asynchronous messages to the server 212, the laptop computer 222, the smartphone 262 or any other computer device in real time or in near-real time, or in one or more offline processes, via the network 270. Those of ordinary skill in the pertinent art would recognize that the marketplace 210, the vendor 220, the fulfillment center 230 or the customer 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the desktop computer 232 or the smartphone 262, or any other computers or control systems utilized by the marketplace 210, the vendor 220, the fulfillment center 230 or the customer 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
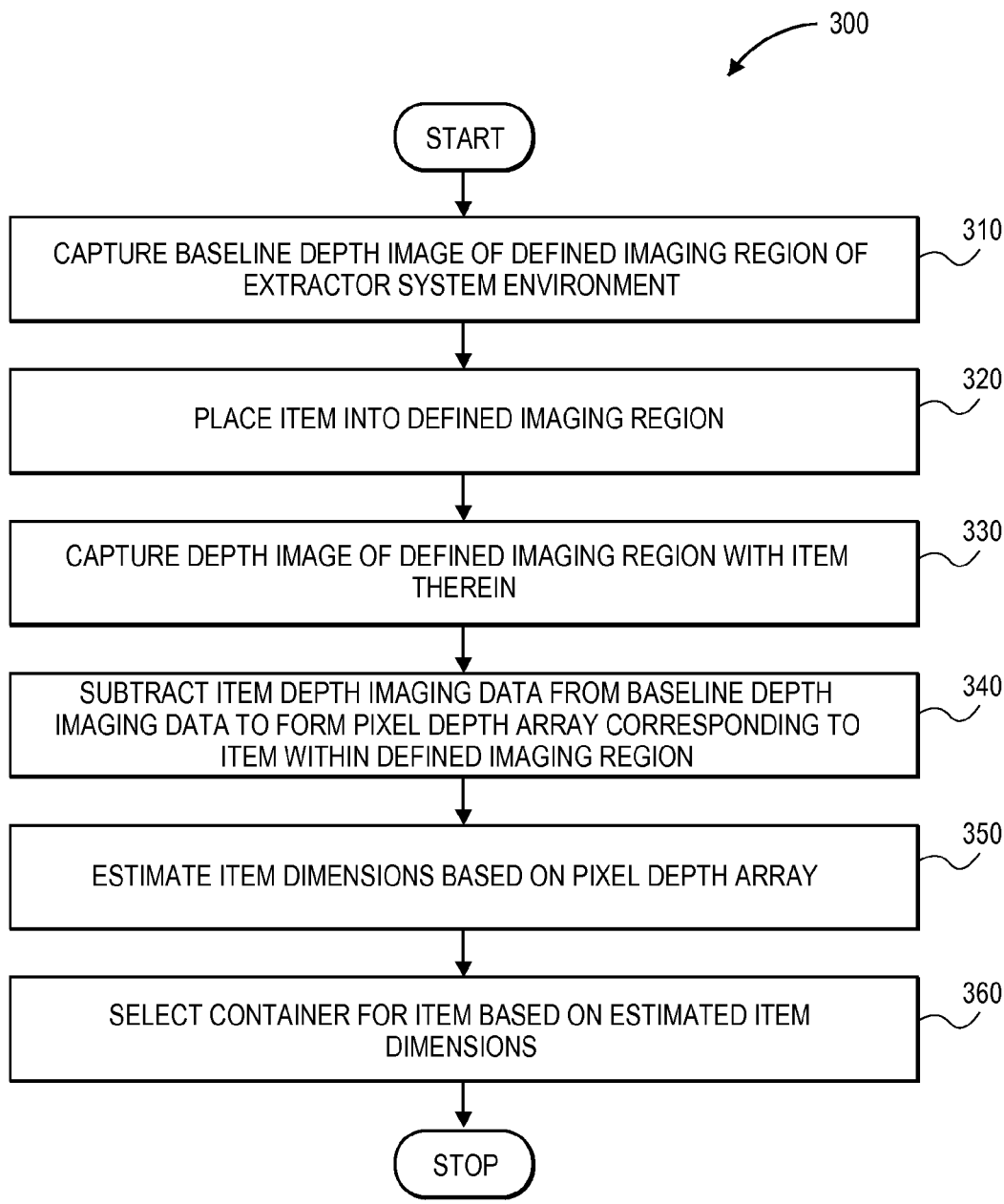
FIG. 3 is a flow chart of one process for automatic visual fact extraction, in accordance with embodiments of the present disclosure.

As is discussed above, the systems and methods of the present disclosure are directed to automatically extracting visual facts from an object, and identifying the object, or determining one or more characteristics of the object, from such automatically extracted visual facts. In some embodiments, dimensions of an object may be estimated using a single depth sensor or range camera, which may be configured to determine data regarding distances to objects in a single direction, which may be interpreted in order to determine multiple dimensions of the object. Referring to FIG. 3, a flow chart 300 representing one embodiment of a process for automatically extracting visual facts in accordance with embodiments of the present disclosure is shown. At box 310, a baseline depth image of a defined imaging region of an extractor system environment is captured. For example, referring again to the system 100 of FIG. 1, a depth image of the defined region of the scale 142 may be captured by the range camera 144. Such a baseline depth image may include information regarding distances between the range camera 144 expressed in pixels corresponding to the defined region, such as the upper surface of the scale 142, in a baseline condition, i.e., without any objects present within the defined region.

At box 320, an item is placed into the defined imaging region, and at box 330, a depth image of the defined imaging region is captured with the item therein. For example, referring again to FIG. 1, a depth image may be captured by the range camera 144 while an object is placed upon the upper surface of the scale 142. The depth image may include information regarding distances between the range camera 144 expressed in pixels corresponding to the various surfaces of the item.

At box 340, the depth imaging data is subtracted from the baseline depth imaging data to define a pixel depth array corresponding to one or more dimensions of the item present within the defined imaging region. By subtracting depth imaging data of the defined imaging region captured with an item therein from depth imaging data of the baseline defined imaging region captured without any items therein, a net result corresponding to depths of the item present within the defined imaging region may be determined. The depths of the item may be calculated and represented according to any standard or benchmark, such as with regard to depths from a depth sensor, or heights above a baseline or benchmark, according to the present disclosure.

At box 350, dimensions of the item are estimated based on the pixel depth array. For example, the pixel depth array itself may be used to directly determine heights of aspects of the object, i.e., dimensions in a z-direction. Additionally, the sizes of the corresponding pixels of the pixel depth array in the x-direction and the y-direction may also be estimated based on the pixel depth array according to one or more trigonometric principles, thereby obtaining an approximation of the dimensions of the item using the single set of data obtained from a depth sensor in the form of the pixel depth array. For example, the values set forth in the pixel depth array may be used to determine absolute or relative values of the sizes of pixels in the x-direction and the y-direction as linear functions of a distance from a lens of the camera in the z-direction. Because pixel sizes are generally defined in a conic or tetrahedral relationship with regard to a distance of an object from a camera sensor, a pixel corresponding to a first portion of an object that is twice as far from the camera sensor as a second portion of the object will be twice the size, in the x-direction and the y-direction, of the pixel corresponding to the second portion.

Once the dimensions of the item are estimated, at box 360, a container is selected for the item based on the estimated dimensions, and the process ends. For example, the dimensions in the x-direction, the y-direction and the z-direction may be used to estimate a bounding volume, a surface area or a length of a longest dimension of the item, which may be used to select one or more boxes, bags, cans, cartons, tubes, bottles, barrels or jars for accommodating the item. Alternatively, the dimensions estimated at box 350 may be used to select a destination or storage region (e.g., a shelf, a bin, a rack, a tier, a bar, a hook or another storage means within a storage area of a fulfillment center) for accommodating the item.

Accordingly, by processing data regarding an object that may be captured using a single depth sensor, such as a net pixel depth array obtained by subtracting depth imaging data of the object from baseline depth imaging data, estimates of dimensions of the object may be obtained. One example of the derivation of a net pixel depth array from information captured using a single depth sensor is shown with regard to FIGS. 4A, 4B and 4C. Except where otherwise noted, reference numerals preceded by the number "4" in FIG. 4A, 4B or 4C indicate components or features that are similar to components or features having reference numerals preceded by the number "1" shown in FIG. 1.

Referring to FIG. 4A, a system 400 including an extraction module 440 having a range camera or depth sensor 444 and a scale 442 is shown. As is discussed above, baseline depth imaging data may be captured of an imaging region defined by the scale 442 using the extraction module 440 without any objects placed thereon. One profile of an array $Z_{BASE}$ of baseline depth imaging data is shown in FIG. 4A. Referring to FIG. 4B, the system 400 of FIG. 4A is shown with an object 40 (viz., a basketball) having a substantially spherical shape placed thereon. One profile of an array $Z_{ITEM}$ of depth imaging data where the item is placed on the scale 442 is shown in FIG. 4B.

As is discussed above, a depth pixel array defining a profile of the item may be derived by subtracting the depth imaging data from the baseline depth imaging data, or by subtracting $Z_{ITEM}$ from $Z_{BASE}$, is shown in FIG. 4C. The net approximation of the dimensions of the object 40 may take the form of a bullet-shaped blob having an upper region corresponding to the substantially spherical shape of the object 40, and a lower region corresponding to a substantially cylindrical shape subtended by the diameter of the object 40 at its widest point, from the perspective of the range camera or depth sensor 444. Once the depth pixel array of the object 40 is derived, such as is shown in FIG. 4C, the information may be processed in order to estimate dimensions of the object such as a length and a width. Such estimated dimensions may be used in any capacity, such as to determine a bounding volume of the object and to identify a specific region where the object may be stored, or to identify a particular container in which the object may be shipped, based on the bounding volume.

Examples of arrays 500A, 500B, 500C of depth pixel data that may be generated in accordance with the present disclosure are shown in FIGS. 5A, 5B and 5C. As is shown in FIG. 5A, the array 500A includes cells arranged in an x-direction and a y-direction and corresponding to the imaging region defined by the scale 442 of FIG. 4A, and dimensions of $y_{542}$ and $x_{542}$. The array 500 contains baseline depth imaging data in standard units (e.g., millimeters) corresponding to the condition of the system 400 of FIG. 4A, in which the imaging region defined by the scale 442 does not include any items thereon, as well as the profile $Z_{BASE}$. Similarly, as is shown in FIG. 5B, the array 500B includes the same cells as the array 500A of FIG. 5A. However, the array 500B of FIG. 5B is populated with depth imaging data in standard units (e.g., millimeters) corresponding to the condition of the system 400 of FIG. 4A, in which the imaging region defined by the scale 442 includes the substantially spherical object 40 thereon, as well as the profile $Z_{ITEM}$.

As is discussed above, pixel depth arrays defining depths or heights of an object may be obtained by subtracting imaging data relating to a region from baseline data regarding the region. Referring to FIG. 5C, the array 500C includes the same cells as the array 500C of FIG. 5C, populated with the net pixel data corresponding to the difference between the baseline depth imaging data of the array 500A of FIG. 5A and the depth imaging data of the array 500B of FIG. 5B, corresponding to the depth profile of the object 40 as shown in FIG. 4C. The net pixel data of the array 500C may be expressed in any dimension, such as standard dimensions of length or distance (e.g., millimeters or inches, or fractions or decimals thereof).

Accordingly, dimensions of an object may be estimated based on a set of depth profile data obtained from a single sensor, which may be used to determine depth data for pixels corresponding to heights of the object, i.e., one or more dimensions of the object in the z-direction, and be manipulated or otherwise evaluated in order to estimate lengths and widths of the object, i.e., dimensions of the object in the x-direction and y-direction. The pixel data may be manipulated by any means and on any basis in order to derive one or more dimensions therefrom.

Figure 6:
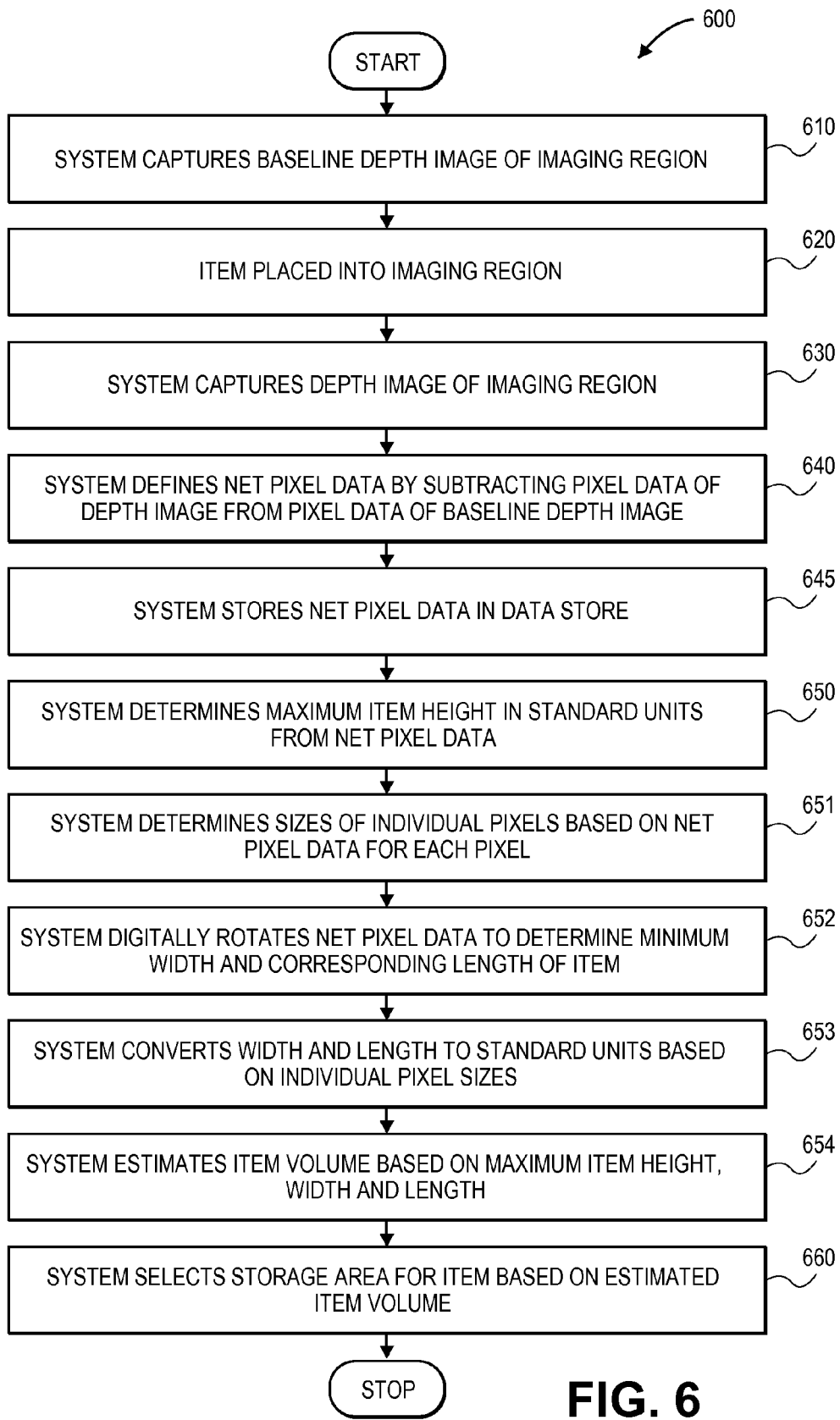
FIG. 6 is a flow chart of one process for automatic visual fact extraction, in accordance with embodiments of the present disclosure.

Referring to FIG. 6, a flow chart 600 representing one embodiment of a process for automatically extracting visual facts in accordance with embodiments of the present disclosure is shown. Except where otherwise noted, reference numerals preceded by the number "6" in FIG. 6 indicate process steps that are similar to process steps having reference numerals preceded by the number "3" shown in FIG. 3.

At box 610, a system captures a baseline depth image of an imaging region. For example, the system may provide a range camera or a depth sensor, such as the range camera 144 of FIG. 1, configured to determine depth information of a region that may be aligned or associated with one or more elements of a conveying system, such as the conveying system 150 of FIG. 1. At box 620, an item is placed into the imaging region, and at box 630, the system captures a depth image of the imaging region with the item therein.

At box 640, the system defines net pixel data corresponding to the item by subtracting pixel data of the depth image from pixel data of the baseline depth image. For example, referring again to FIGS. 5A, 5B and 5C, the pixel data array 500C of FIG. 5C is derived by subtracting the depth imaging data in the array 500B of FIG. 5B from the baseline depth imaging data in the array 500A of FIG. 5A, with the resulting data set forth in the array 500C corresponding to depths of pixels corresponding to various aspects of the item.

At box 650, the system determines a maximum item height, i.e., in the z-direction, in standard units from the pixel data. For example, referring again to FIG. 5C, the maximum height of the object 40 of FIGS. 4B and 4C is determined to be approximately 240 millimeters (or mm), based on the largest values of data in the cells. At box 651, the system determines a size of each of the individual pixels, i.e., in the x-direction and y-direction, based on the values of the data corresponding to the heights or depths of such pixels as set forth in the cells. For example, referring again to FIG. 5C, the widths of the various pixels may be estimated based on the values of the corresponding cells as functions of the distance from the imaging sensor and the portion of a field of view corresponding to the item.

At box 652, the system digitally rotates the net pixel data to determine a minimum width and a corresponding length of the item in pixels, and at box 653, the system converts the minimum width and corresponding length to standard units (e.g., millimeters). For example, where the item is determined to have a substantially irregular shape, e.g., unlike the spherical object 40 of FIG. 4B, or is positioned askew within the field of view of the range camera or depth sensor, rather than mathematically determining a minimum width from the corresponding net pixel data, the net pixel data itself may be virtually rotated at nominal angular intervals, viz., one degree at a time, until a smallest distance between a left-most non-zero pixel value and a right-most non-zero pixel value within the net pixel data is determined. The smallest such distance between such non-zero pixels corresponds to the minimum width of the item, and a corresponding distance in a counterpart or opposing axis corresponds to a length of the item.

At box 654, the system estimates the volume of the item based on the estimated height, width and length. The estimated volume may be a bounding volume defined by the net pixel height data as well as the width and length, which may be used to identify a smallest container or region that may accommodate the features of the item without having to determine the dimensions of the item, or of the various features of the item, with precision. At box 660, the system selected a destination for the item, e.g., a bay, a shelf or another feature present within a storage region, based at least in part on the estimated volume.

Accordingly, the systems and methods of the present disclosure may be used to estimate dimensions of objects by capturing depth information and data regarding an object from a single sensor, and manipulating the depth information and data to determine horizontal dimensions of the object. In this regard, such systems and methods may be used to determine estimated volumes of objects, even of eccentrically shaped objects, and such volumes may be used for any purpose, i.e., to identify one or more containers for such objects.

The estimation of a volume of an eccentrically shaped object according to some embodiments of the systems and methods of the present disclosure, such as the process for automatically extracting visual facts represented in the flow chart 600 of FIG. 6, is shown in FIG. 7. Except where otherwise noted, reference numerals preceded by the number "7" in FIG. 7 indicate components or features that are similar to components or features having reference numerals preceded by the number "4" shown in FIG. 4A, 4B or 4C, or by the number "1" shown in FIG. 1.

As is shown in FIG. 7, a system 700 includes an extraction module 740 having a range camera or depth sensor 744 and a scale 742 with an eccentrically shaped object 70 thereon. Additionally, FIG. 7 further shows a profile of depth image data captured when the eccentrically shaped object 70 is placed on the scale 742.

As is discussed above, the depth image may be rotated to determine a minimum width x and a corresponding lengthy of the object 70, such as is shown in connection with the top view of the object of FIG. 7. For example, the depth image data may be virtually rotated at nominal angular intervals until a smallest distance across the object 70 is determined, and a corresponding distance in a counterpart or opposing axis corresponds to a length of the object 70. Likewise, a height z of the object may also be determined from one or more pixels represented in the depth image data, such as is shown in connection with the side view of the object of FIG. 7. Once the estimated dimensions (viz., the width x, length y and height z) have been determined, an estimated volume of the object may be determined based at least in part on such dimensions.

As is also discussed above, the systems and methods of the present disclosure may be further configured to capture a variety of information regarding an object, and identify the object based on such information, and select a destination for the object based on the identity. For example, in addition to determining dimensions of items using a depth sensor or range camera, such as is discussed above, the systems and methods disclosed herein may also be configured to capture images of various faces or aspects of an object, or masses or weights of the object. Such images may be evaluated in order to identify and interpret any markings, labels or other identifiers disposed thereon, or to provide information regarding an identity of the item, contents of the item, or a preferred destination for the item, while such masses or weights of the item may also be used to determine an identity of an item, or contents of the item, and to further identify a preferred destination for the item.

Figure 8:
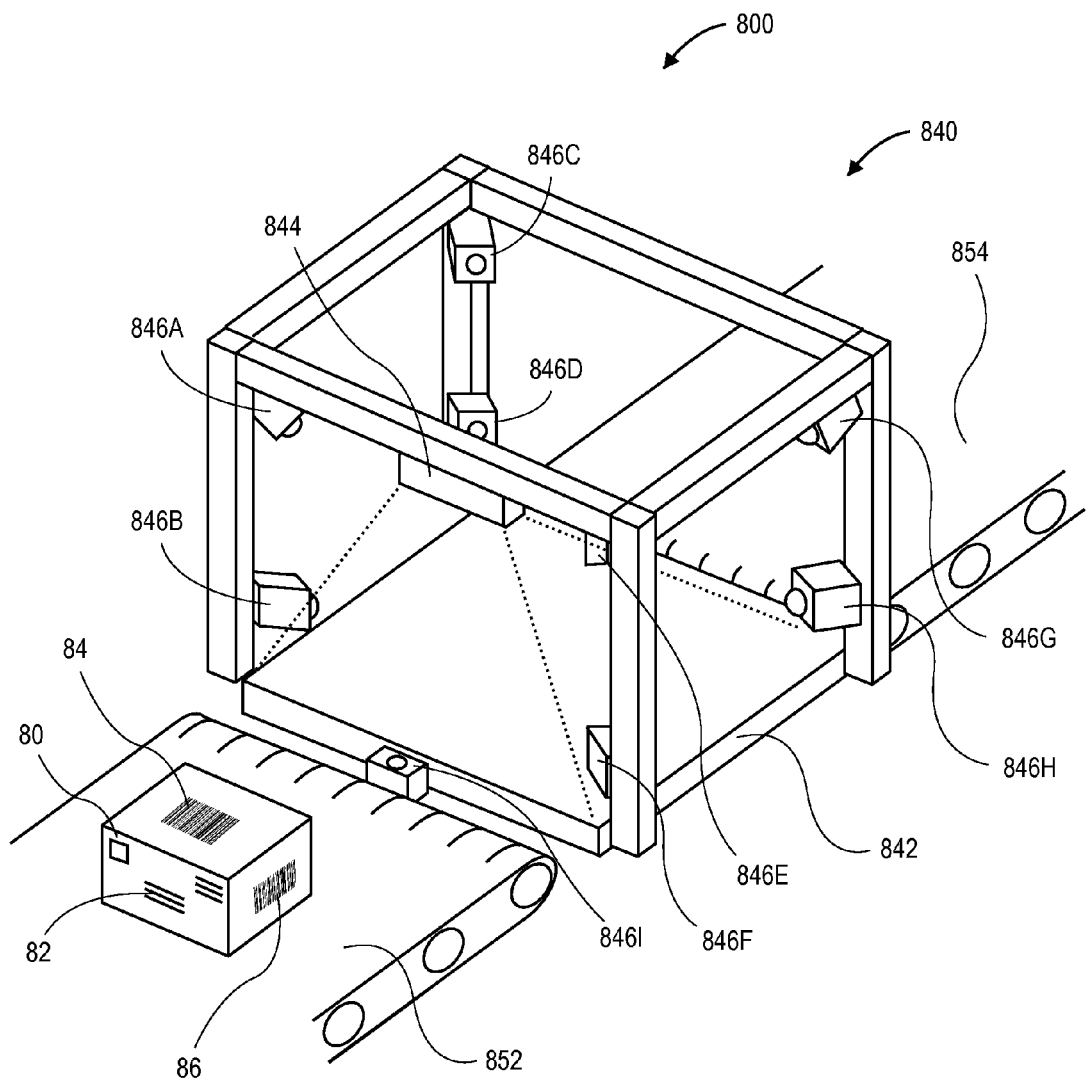
FIG. 8 is a view of one system for automatic visual fact extraction, in accordance with embodiments of the present disclosure.

Referring to FIG. 8, a system 800 for automatic visual fact extraction in accordance with embodiments of the present disclosure is shown. Except where otherwise noted, reference numerals preceded by the number "8" in FIG. 8 indicate components or features that are similar to components or features having reference numerals preceded by the number "7" shown in FIG. 7, by the number "4" shown in FIG. 4A, 4B or 4C, or by the number "1" shown in FIG. 1.

The system 800 includes an extractor module 840 aligned in series with a conveyor system 850. The extractor module 840 of FIG. 8 comprises a scale 842, a depth sensor or range camera 844 and a plurality of digital cameras 846A, 846B, 846C, 846D, 846E, 846F, 846G, 846H, 846I. The conveyor system 850 includes an ingress conveyor 852 and an egress conveyor 854 for transporting an item 80 through the extractor module 840. The item 80 includes an address label 82 including sets of text and bar codes 84, 86 on visible surfaces thereon.

The digital cameras 846A, 846B, 846C, 846D, 846E, 846F, 846G, 846H, 846I may be any type or form of digital camera or imaging device in accordance with the present disclosure, such as a line scan camera, e.g., an imaging device that operates by capturing a series of images of a portion of an object in relative motion with respect to the camera or imaging device, wherein each of the images has a defined number of pixels in width, and a minimal number of pixels (e.g., as few as one) in length, and may be assembled or combined into an aggregate or composite image having the defined number of pixels in width, and any number of pixels in length. For example, the digital camera 846I may be provided as a line scan camera oriented with a field of view pointing vertically upward, for capturing images of a single pixel length as the item 80 passes over a gap between the ingress conveyor 852 and the scale 842, as is shown in FIG. 8. Alternatively, one or more of the cameras 846A, 846B, 846C, 846D, 846E, 846F, 846G, 846H, 846I may be area scan cameras (sometimes called an "area array camera" or like terms), which are provided with two-dimensional matrices or arrays of pixels having varying resolutions.

Any number or type of digital camera or other imaging device may be provided in accordance with embodiments of the present disclosure, based at least in part on the projected dimensions of items to travel through the extractor module, or the one or more specific applications in which the system 800 is to be employed. Moreover, the fields of view of the cameras 846A, 846B, 846C, 846D, 846E, 846F, 846G, 846H, 846I may be oriented in any manner.

Accordingly, the system 800 of FIG. 8 may be configured to capture a variety of information extracted from an item 80. For example, the scale 842 may be configured to determine a mass of the item 80 as the item 80 passes across the scale between the ingress conveyor 852 and the egress conveyor 854. Additionally, the depth sensor 844 may be configured to determine distances to various portions or aspects of the item 80 as the item passes thereunder. Furthermore, one or more of the various digital cameras 846A, 846B, 846C, 846D, 846E, 846F, 846G, 846H, 846I may be configured to capture one or more still or moving images of the item 80 as the item 80 passes through the extraction module 840. Such images may be evaluated to identify any external markings on the item 80, such as the address label 82 or the bar codes 84, 86.

Using the information extracted from the item 80 present within the extraction module 840 of FIG. 8, an identity of the item 80, as well as one or more characteristics of the item 80, may be determined. For example, as is discussed above, the dimensions of the item 80 may be estimated based at least in part on the distances to one or more faces or corners of the item 80 as determined by the depth sensor 844. Additionally, the markings disposed on the item 80, including the text of the address label 82 or the bar codes 84, 86 may be identified and decoded, and subsequently used to access further information regarding the item 80 that may be maintained in a record or file maintained in a database or other data store. The mass of the item 80, the distances or orientations of the item 80, or the information that may be accessed following an evaluation of the address label 82 or the bar codes 84, 86 may then be used to identify the item 80 or characteristics of the item 80. Once the item 80 or characteristics thereof have been identified, a destination for the item 80 (e.g., an area or region where the item 80 is to be stored, or a station where the item 80 may be prepared for delivery to an intended destination).

Figure 9:
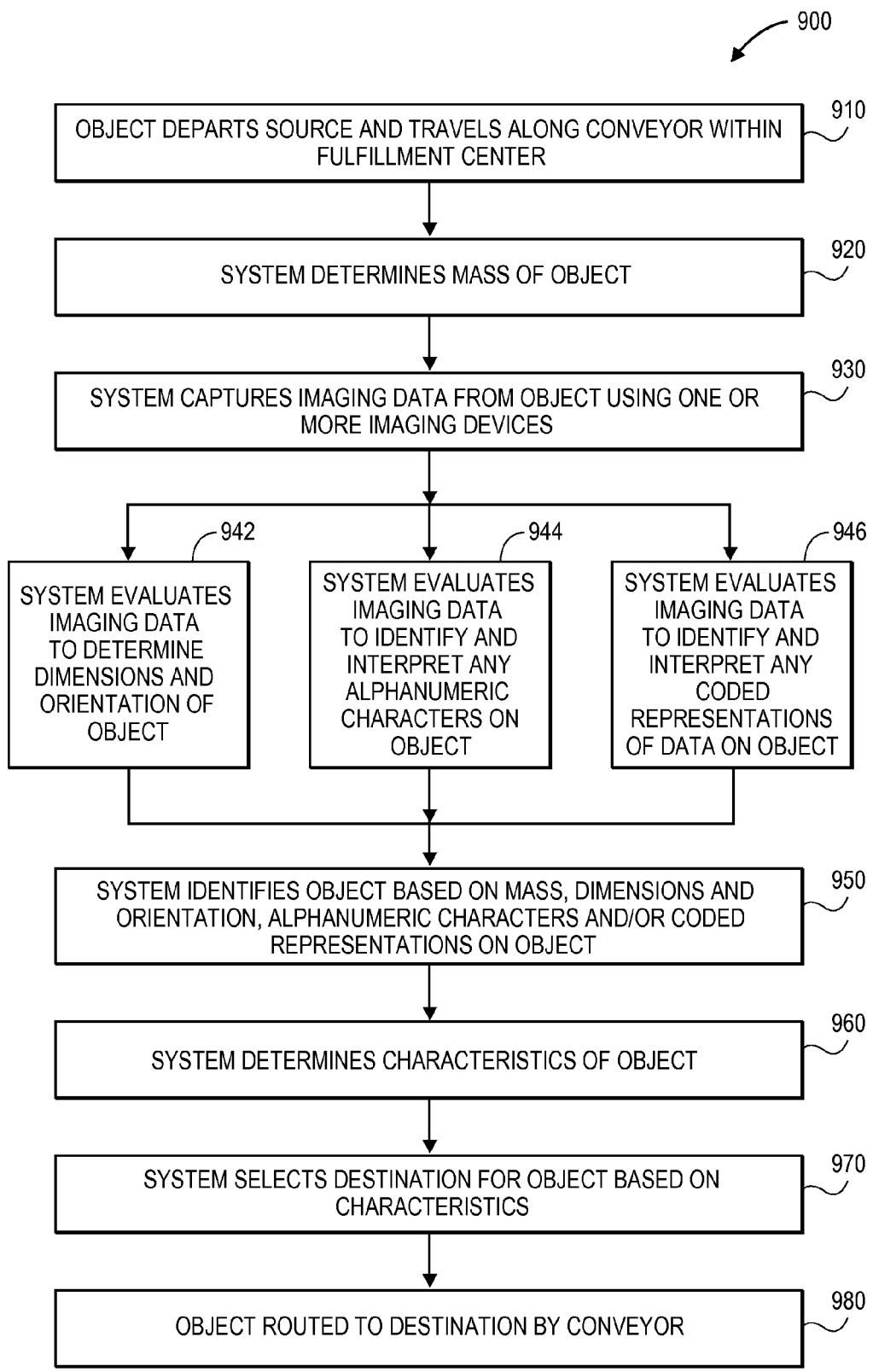
FIG. 9 is a flow chart of one process for automatic visual fact extraction, in accordance with embodiments of the present disclosure.

Referring to FIG. 9, a flow chart 900 representing one embodiment of a process for automatically extracting visual facts in accordance with embodiments of the present disclosure is shown. At box 910, an object departs a source and travels along a conveyor within a fulfillment center. For example, when an item or a container of items arrives at a receiving station of a fulfillment center, the item or container may be placed onto one or more belts, rollers or tracks.

At box 920, a system determines a mass of the object, and at box 930, the system captures imaging data regarding the objet using one or more imaging devices. For example, referring again to the system 800 of FIG. 8, the item 80 may arrive at the extractor module 840 by way of the ingress conveyor 852. A mass or weight of the item may be determined as the item 80 passes along the scale 842, while depths or ranges to the item 80 may be determined by the depth sensor or range camera 844, and one or more digital images of various aspects or perspectives of the item 80 may be captured by the cameras 846A, 846B, 846C, 846D, 846E, 846F, 846G, 846H.

The imaging data regarding the object captured at box 930 may be subject to one or more analyses in parallel in order to determine one or more characteristics of the object. At box 942, the system evaluates the imaging data to determine one or more dimensions of the object, and an orientation of the object. For example, as is discussed above, a depth sensor or range camera, such as the depth sensor or range camera 844, may determine data regarding depths of objects and/or ranges to objects passing within a vicinity thereof, and from such data, one or more dimensions of the object (e.g., heights, widths and/or lengths, or an orientation of the object, may be determined.

At box 944 and box 946, the system may also evaluate the imaging data to identify and interpret any alphanumeric characters (e.g., text, numbers or other like markings) or coded representations (e.g., one-dimensional or two-dimensional bar codes) disposed on the object. For example, an external surface of an item or a container thereof may include a shipping label having text or markings identifying a sender or intended recipient of the item, or contents of the item, and may also include one or more bar codes, such as a Universal Product Code (or "UPC"), which may also be interpreted in order to identify the item.

Once a mass, dimensions and/or an orientation of the object have been determined, and any alphanumeric characters or coded representations disposed on a surface of the object have been evaluated, the process advances to box 950, where the system identifies the object based on the mass, dimensions or orientation of the object, or using the alphanumeric characters or coded representations disposed on the object. The various attributes and characteristics may be used to identify an object on any basis.

At box 960, the system determines one or more characteristics of the identified object. Upon identifying the item based on its mass, its dimensions and orientation, and any characters or coded representations thereon at box 950, the system may determine the contents of the item (e.g., whether the item contains fragile components, electronic circuits or hazardous materials), as well as whether an order has already been received for the item, or whether the item requires specific handling procedures (e.g., a particular type of box or wrapping). At box 970, the system selects a destination for the item based on the characteristics of the item (e.g., a specific shelf, bin, rack, tier, bar, hook for storing the item, or a particular station where the item may be prepared for delivery to an intended destination). At box 980, the object is routed to the destination by the conveyor, and the process ends. For example, once an appropriate location for handling or storing the item is determined based on its identity and its characteristics at box 960, the item may be delivered to the location by way of one or more conveyors.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the extraction modules disclosed herein are shown as operating in series with a single ingress conveyor belt and a single egress conveyor belt, the systems and methods are not so limited, and may be utilized with any number of ingress or egress conveyors of any type. Additionally, although some of the embodiments of the present disclosure utilize imaging devices, such as depth sensors or range cameras, configured to capture information or data in a vertically downward orientation, or in a z-direction, e.g., with one or more objects passing thereunder, the systems and methods disclosed herein are not so limited, and may be adapted to capture information using one or more imaging devices (e.g., depth sensors, range cameras, digital cameras or the like) that are aligned in any orientation.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 6 and 8, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A visual fact extraction system comprising:
    an extraction module including a depth sensor mounted to a frame, wherein the extraction module defines an imaging region adapted to receive an object therein, and wherein the depth sensor is configured to capture depth imaging data from the imaging region; and
    a computing device in communication with the depth sensor,
    wherein the computing device is configured to at least:
        capture baseline depth imaging data from the imaging region using the depth sensor, wherein the baseline depth imaging data comprises information regarding distances between the depth sensor and the imaging region without an object therein;
        receive an object at the imaging region;
        capture depth imaging data from the imaging region using the depth sensor, wherein the depth imaging data comprises information regarding distances between the depth sensor and the imaging region with the object therein;
        generate net depth imaging data based at least in part on the baseline depth imaging data and the depth imaging data, wherein the net depth imaging data comprises a plurality of pixels corresponding to the imaging region;
        estimate a first dimension of the object based at least in part on the net depth imaging data;
        determine a two-dimensional size of at least one of the plurality of pixels based at least in part on the first dimension;
        identify a portion of the plurality of pixels corresponding to the object;
        estimate a second dimension of the object based at least in part on the two-dimensional size and the portion of the pixels;
        estimate a third dimension of the object based at least in part on the two-dimensional size and the portion of the pixels; and
        select a container for the object based at least in part on the first dimension, the second dimension and the third dimension.

2. The visual fact extraction system of claim 1, wherein the first dimension is a maximum height of the object.

3. The visual fact extraction system of claim 1, wherein the visual fact extraction system further comprises:
    at least one ingress conveyor configured to transport objects from an origin to the imaging region; and
    at least one egress conveyor configured to transport objects from the imaging region to one of a plurality of destinations.

4. The visual fact extraction system of claim 3, wherein the computing device is further configured to at least:
    cause the object to be transported from the origin to the imaging region by way of the at least one ingress conveyor;
    select one of the plurality of destinations for the object based at least in part on the first dimension;
    cause the object to be transported from the imaging region to the selected one of the plurality of destinations by way of the at least one egress conveyor; and
    cause the object to be packed into the selected container at the selected one of the plurality of destinations.

5. A method for extracting facts comprising:
    capturing a first set of depth imaging data of a defined region using a first depth sensor;
    capturing a second set of depth imaging data of the defined region using the first depth sensor, wherein the second set of depth imaging data is captured with an object present within the defined region;
    determining a net depth profile of the object based at least in part on the first set of depth imaging data and the second set of depth imaging data using at least one computer processor, wherein the net depth profile comprises a plurality of pixels corresponding to the defined region;
    estimating a first dimension of the object based at least in part on the net depth profile;
    determining a two-dimensional size of at least one of the plurality of pixels based at least in part on the first dimension;
    identifying a portion of the plurality of pixels corresponding to the object;
    estimating a second dimension of the object based at least in part on the two-dimensional size and the portion of the pixels;
    estimating a third dimension of the object based at least in part on the two-dimensional size and the portion of the pixels;
    storing an association of the net depth profile and the object in at least one data store; and
    selecting a container for the object based at least in part on the first dimension, the second dimension and the third dimension.

6. The method of claim 5, further comprising:
    estimating a bounding volume of the object based at least in part on the first dimension, the second dimension and the third dimension,
    wherein the container is selected for the object based at least in part on the bounding volume.

7. The method of claim 5, wherein determining the net depth profile of the object based at least in part on the first set of depth imaging data and the second set of depth imaging data comprises:
    defining an array having a plurality of cells based at least in part on a difference between the second set of depth imaging data and the first set of depth imaging data, wherein each of the cells corresponds to one of the plurality of pixels, and wherein the net depth profile is determined based at least in part on the array.

8. The method of claim 7, further comprising:
populating the plurality of cells with ranging data for at least some of the pixels of the defined region; and
estimating the first dimension of the object based at least in part on the ranging data for at least one of the pixels of the defined region.

9. The method of claim 7, further comprising:
populating the plurality of cells with ranging data for at least some of the pixels of the defined region; and
estimating the two-dimensional size of the at least one of the plurality of pixels based at least in part on the ranging data.

10. The method of claim 8, further comprising:
determining a number of the pixels of the defined region corresponding to the object;
estimating the second dimension of the object based at least in part on the number of the pixels and the first dimension of the object; and
estimating the third dimension of the object based at least in part on the number of the pixels and the first dimension of the object.

11. The method of claim 8, wherein the first dimension corresponds to a largest value of the ranging data for the plurality of the pixels of the defined region corresponding to the object.

12. The method of claim 5, wherein the first depth sensor comprises an infrared projector and an infrared sensor, and
wherein the capturing the first set of depth imaging data of the defined region using the first depth sensor comprises:
projecting a first plurality of infrared beams into the defined region using the infrared projector without the object present within the defined region;
capturing a second plurality of infrared beams reflected from the defined region using the infrared sensor; and
generating the first set of depth imaging data based at least in part on the second plurality of infrared beams using the at least one computer processor.

13. The method of claim 12, wherein the method further comprises:
projecting a third plurality of infrared beams into the defined region using the infrared projector with the object present within the defined region;
capturing a fourth plurality of infrared beams reflected from the defined region using the infrared sensor; and
generating the second set of depth imaging data based at least in part on the fourth plurality of infrared beams using the at least one computer processor.

14. The method of claim 5, further comprising:
determining a mass of the object using at least one scale, wherein a weighing surface of the at least one scale comprises the defined region, and wherein the computing device is in communication with the at least one scale,
wherein selecting the container for the object based at least in part on the net depth profile further comprises:
selecting the container for the object based at least in part on the first dimension, the second dimension, the third dimension and the mass.

15. The method of claim 5, further comprising:
causing placement of the object into the defined region by causing transport of the object from an origin to the defined region on a first conveyor;
causing transport of the object from the defined region to a destination on a second conveyor; and
causing the object to be deposited into the selected container at the destination.

16. A system comprising:
an electronic scale;
a depth sensor;
a plurality of imaging devices; and
a computing device in communication with the electronic scale, the depth sensor and at least one of the plurality of the imaging devices,
wherein the computing device is configured to at least:
capture at least one image of a visible surface of an object on a surface of the electronic scale using one or more of the imaging devices, wherein the visible surface comprises at least one identifier disposed thereon;
determine a mass of the object using the electronic scale;
capture a depth image of the object using the depth sensor, wherein the depth image comprises a plurality of pixels representing distances between the depth sensor and the electronic scale with the object thereon;
analyze the at least one image to interpret the at least one identifier;
estimate a maximum height of the object based at least in part on the depth image;
determine a two-dimensional area of at least one of the plurality of pixels based at least in part on the maximum height of the object;
identify a portion of the depth image corresponding to the object;
estimate a maximum length and a maximum width of the object based at least in part on the two-dimensional area and the portion of the depth image corresponding to the object; and
select a container for the object based at least in part on the mass of the object, the at least one identifier, the maximum height, the maximum length and the maximum width.

17. The system of claim 16, further comprising at least one conveyor in communication with the computing device,
wherein the computing device is further configured to:
select a destination associated with the container; and
cause a delivery of the object to the selected destination using the at least one conveyor.

18. The system of claim 16, wherein the identifier is one of a one-dimensional bar code, a two-dimensional bar code, a bokode, a character, a number, a symbol or a color.

19. The system of claim 16, wherein at least one of the plurality of imaging devices is a line scan camera.

20. The visual fact extraction system of claim 1, wherein the second dimension is a maximum length of the object, and
wherein the third dimension is a maximum width of the object.

21. The method of claim 5, wherein the first dimension is a maximum height of the object,
wherein the second dimension is a maximum length of the object, and
wherein the third dimension is a maximum width of the object.

* * * * *